United States Patent [19]

Kristinsson

[11] Patent Number: 4,599,765
[45] Date of Patent: Jul. 15, 1986

[54] DEVICE FOR DECAPITATING FISH BY A CUTTING ACTION

[76] Inventor: Sigurdur Kristinsson, Mávahlid 11, Saudarkrókur, Iceland

[21] Appl. No.: 527,182

[22] Filed: Aug. 29, 1983

[30] Foreign Application Priority Data

Sep. 11, 1982 [DE] Fed. Rep. of Germany ....... 3233747

[51] Int. Cl.⁴ ............................................. A22C 25/14
[52] U.S. Cl. ....................................................... 17/63
[58] Field of Search ...................................... 17/63, 60

[56] References Cited

U.S. PATENT DOCUMENTS 2,961,697 11/1960 Schlichting .......................... 17/63 X 4,389,750 6/1983 Kristinsson et al. ..................... 17/63

Primary Examiner—Willie G. Abercrombie
Attorney, Agent, or Firm—Thomas R. Morrison

[57] ABSTRACT

The invention concerns a device for beheading fish whose throat has been cut by opening the gill cavity from the belly side. To carry out the decapitating cut the fish is seized conveyingly by means of an entraining element engaging the gill cavity after alignment with respect to the gill cavity with the help of a pin-shaped support element and moved against the cutting device by displacement of a back support which supports the back of the fish resiliently. The cutting device may either comprise a plane cutting knife or a pair of wedge cutting knives.

16 Claims, 6 Drawing Figures

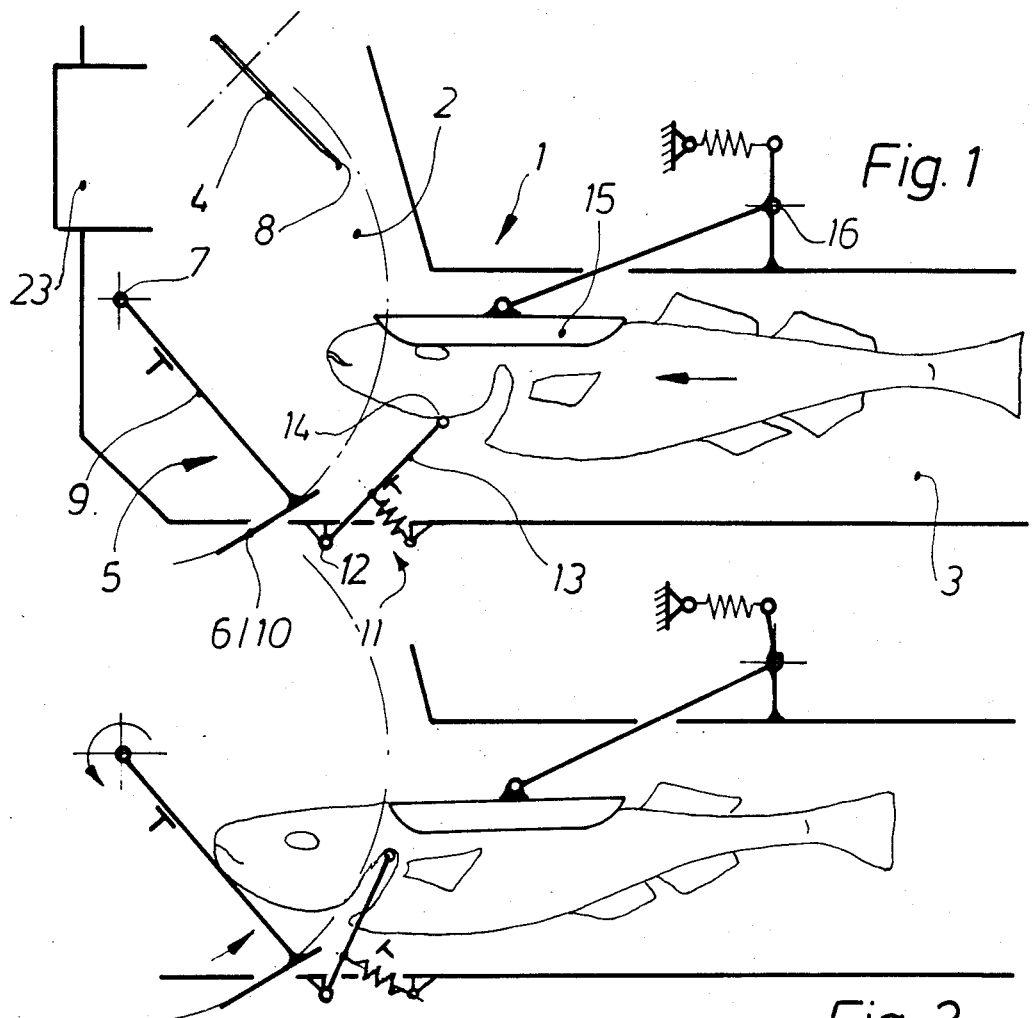
Fig. 1
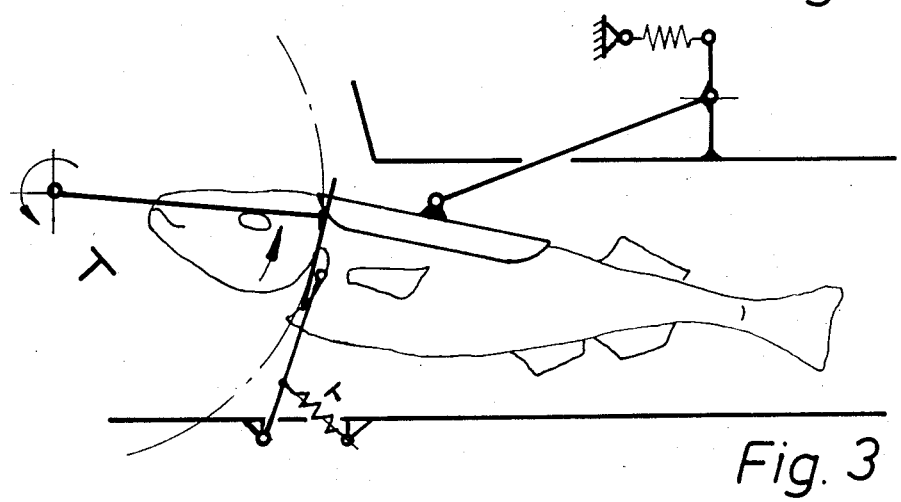
Fig. 2
Fig. 3

4,599,765

DEVICE FOR DECAPITATING FISH BY A CUTTING ACTION

BACKGROUND OF THE INVENTION

1. Field of the Invention

The invention concerns a device for decapitating by a cutting action fish having their throat opened, the device comprising at least a support surface for the fish to be processed, with a cutting mechanism for performing the decapitating cut and a conveyor carrying at least one entraining element for moving the fish against the cutting mechanism.

2. Description of Prior Art

Various devices for beheading fish opened by their throat are known in which the gill cavity opened on the belly side by the throat cut is used as an aligning element to achieve an economical beheading cut. A beheading device can be taken e.g. from German Patent No. 1 579 416 in which the fish is suspended on a bar by its gill cavity opened by the throat cut, engaged at its head side and tail side by entraining elements emerging from below and pushed against the circular knife of the cutting mechanism. In this device it is necessary to bring the fish, which lies on its side, into the swimming position so that it, can be fed onto the conveying path, and at least to lift the head above the bar so that the latter can be inserted into the gill cavity. This handling is especially disadvantageous in heavier fish for ergonomic reasons. Furthermore, due to the conveying of the fish in a position transverse to their longitudinal extension in this known device, the head of the fish can only be separated by a plane cut which excludes the desired economy in cutting if it concerns the preparatory working step for producing boneless fillets. The economic applicability of the known device is therefore essentially limited to beheading fish which are to be processed further to dry cod (klipfish) snce there it is desired that the bones of the shoulder girdle remain on the rump of the fish as they serve as a prop in the spread position during drying.

3. Object of the Invention

It is therefore an essential object of the invention to provide for a possibility of beheading fish in an ergonomically more expedient manner. It is a further important object of the invention to put such decapitating into effect by enabling a further processing into boneless fillets at high yield.

SUMMARY OF THE INVENTION

To achieve these objects in a device comprising at least a support surface for the fish to be processed, a cutting mechanism for performing the decapitating cut and a conveyor carrying at least one entraining element for moving the fish against the cutting mechanism, it is proposed according to the invention that the support surface is arranged to receive the fish resting on its side and head first, that a pin-shaped support element looming approximately perpendicular to the support surface is arranged to hold resp. guide the fish at the base of the throat cut, that each entraining element is driven to pivot in a controlled manner about an axis essentially perpendicular to the support surface, to engage the throat cut from the belly side during its pivoting motion and to entrain the fish in a guided manner against the cutting mechanism in continuation of this pivoting movement, and that the cutting plane of the cutting mechanism is arranged essentially perpendicular to the support surface and tangential to the path of the entraining element.

Thereby the device can be fed in an energy-saving manner which enables a speedy loading frequency. Furthermore the device can be used for the production of klipfish as well as for producing boneless fillets at high yield.

Designing the entraining element(s) as essentially V-shaped resp. fork-shaped elements open in the conveying direction with their plane of symmetry extending essentially parallel to the support surface and being secured to a pivot arm which may preferably be driven in a reversing manner has shown itself to be advantageous due to its fish centering and aligning effect. In order to align its path easily and exactly the entraining element may be controlled by a cam or a lever.

To obtain an especially simple and efficient construction of the device according to the invention the conveyor can be arranged as a continuously circulating endless drive in a plane essentially parallel to the plane of the support surface, which endless drive may be equipped with at least one of the entraining elements whose effective or working surface may run essentially perpendicular to the plane of the support surface and whose path may be almost tangential to the cutting plane of the cutting mechanism in the region of a deflection pulley.

To prepare the fish for the production of boneless fillets with high flesh yield the cutting mechanism may be provided with a pair of cirular knives placed in a wedge-shaped manner with respect to each other as known whose plane of symmetry halving the angle between them runs essentially parallel to the support surface and whose distance to the latter may be adjustable by the fish depending on its size.

BRIEF DESCRIPTION OF THE DRAWINGS

Other and further objects of the present invention will be apparent from the following description and claims and are illustrated in the accompanying schematic drawings, which, by way of illustration, show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

FIG. 1 shows a top view of a device having a conveyor driven in alternating directions with a fish in the feeding phase, FIG. 2 shows a partial representation of the device of FIG. 1 after the fish has been fed, FIG. 3 shows the device at the beginning of the conveying by the entraining elements.

DETAILED DESCRIPTION OF THE PREFERRED EMBODIMENT

Figure 4:
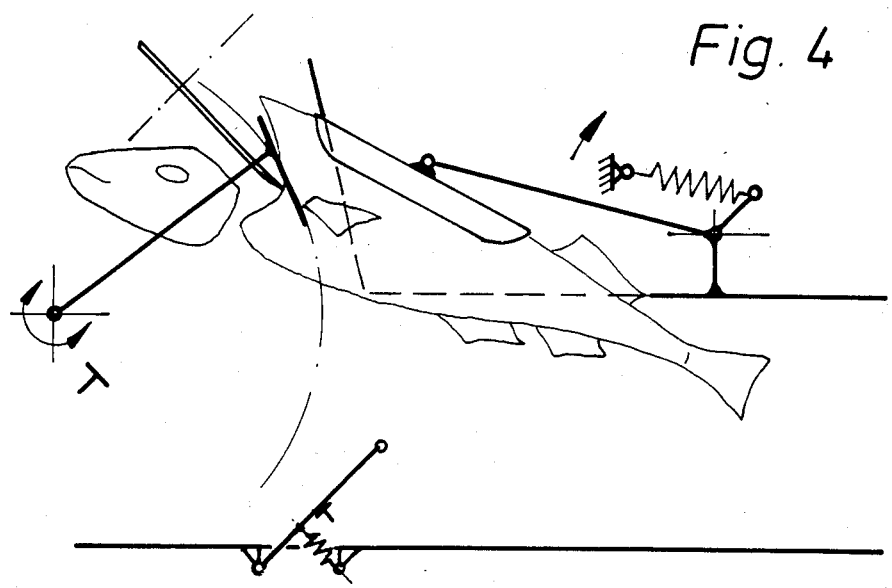
FIG. 4 shows the device after separation of the head.

The device according to the invention comprises basically a frame only vaguely indicated in the drawings and carrying a driving mechanism for the different functional units as well as the functional units themselves, the frame having a feeding table 1 with a support surface 2 for the fish to be processed. In a rearward region of the feeding table 1 turned away from a feeding side 3 there is arranged a cutting device which comprises a rotatingly driven circular knife 4 with a cutting plane essentially perpendicular to the support surface 2. In the region of the effective cutting edge 8 of the circular knife 4 the cutting plane is approximately tangential to a path of entraining elements 6 of a conveyor 5 driven in an appropriate manner pivotally about an axis 7. Each entraining element 6 is carried by a pivot arm 9 and formed as a V-shaped fork-like element 10 open in the conveying direction, the plane of symmetry of the fork-shaped piece extending parallel to the support surface. A feeler 11 is arranged in the region of the feeding side 3, which feeler includes a lever 13 pivotal about a perpendicular axis 12 and held back in an anticlockwise manner and having a pin-shaped support or holding element 14 effective as a feeling or detecting edge, the support element being positioned outside the path of the entraining elements 6. The feeler 11 is connected to a signal emitter 25 (FIG. 6) which can be activated by movement of the layer 13. A back support 15 is arranged positioned opposite the feeling edge 14, which back support is designed so that it can be displaced resiliently about an axis 16 essentially perpendicular to the support surface 2 of the feeding table 1.

Figure 5:
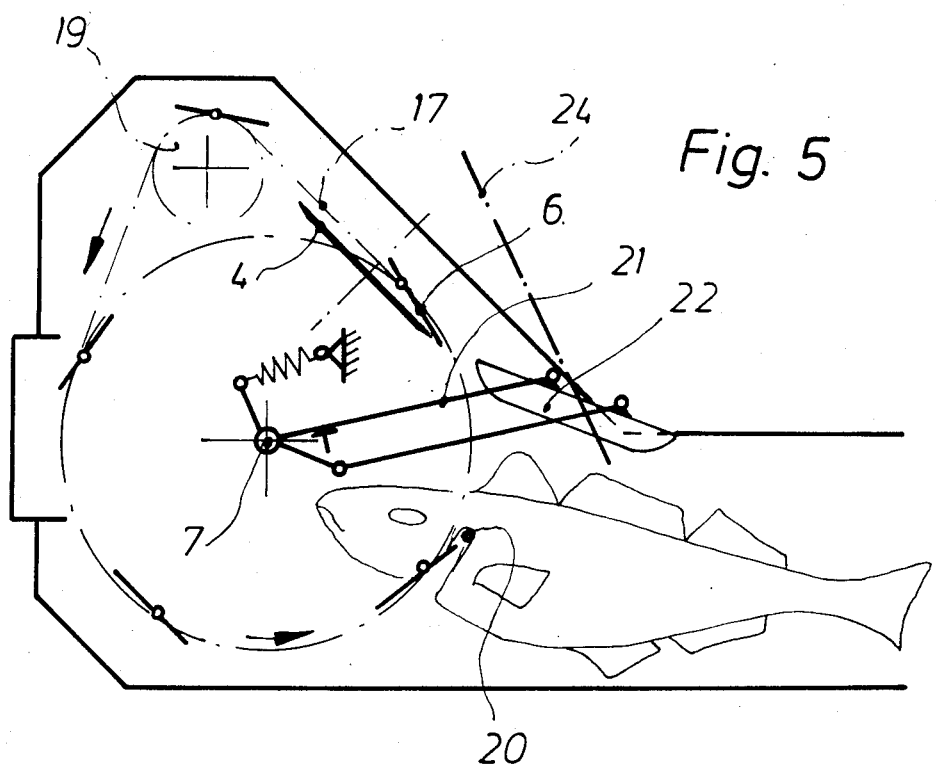
FIG. 5 shows a schematic top view of another embodiment of the invention having a continuously moving conveyor.

In the embodiment of the device represented in FIG. 5 a continuously circulating conveyor 17 is provided which is equipped with a number of entraining elements 6 of the type described or which may also be of any appropriate type. The entraining elements 6 are secured to the rotatingly driven continuous resp. endless drive 18. The latter determines such a path for the entraining elements 6 that they are guided directly and closely past the back side of the circular knife 4 and led back after going around a deflection pulley 19. Instead of the feeler as applied in the embodiment of FIGS. 1 to 4 an aligning element 20 is arranged next to the path of the entraining elements 6, the position of the aligning element 20 corresponding approximately to the pin-shaped support element 14 of the device according to FIGS. 1 to 4 and the aligning element being formed e.g. as a round rod or pole secured in the support surface 2 and extending perpendicularly to the latter. A back support 22 is mounted pivotally about an axis 7 of the conveyor 17 opposite the aligning element 20. This back support 22 is displaceable resiliently in an anticlockwise manner and guided by means of parallelogram levers 21.

The method of operation of the device of FIGS. 1 to 4 is as follows:

A fish opened by a throat cut in its gill cavity is advanced manually in its natural swimming direction with its flank on the support surface 2 so that its head comes to lie between the back support 15 and the feeler 11. In further advancing the pin-shaped support element 14 of the feeler 11 slides along the contour of the lower jaw resp. the edges of the gill cover and the back support 15 is displaced resiliently through the back of the fish. The pin-shaped support element 14 finally reaches the bottom of the throat cut and comes to lie against the bottom edge of the vertebral column. When the advancing continues the pin-shaped support element is entrained supported on the shoulder girdle bones and thus the lever 13 is swung against the effect of the springs effecting the resiliency, the signal emitter 25 connected to the lever 13 thus being activated. As a consequence of this activity the conveyor 5 is set into operation which effects that the entraining element 6 is pivoted into the gill cavity. Due to the form of the entraining element 6 as a fork-shaped element 10 the neck area of the fish is gripped as by a fork so that the backbone is supported at the base of the fork-shaped element 10. The now conveyingly seized fish is moved in the further progress of the pivoting of the entraining element 6 against the circular knife 4 while displacing the back support 15, which knife 4 separates the head by a cut starting from the cranium and forming the connection with the gill cavity next to the entraining element 6. While the head is thrown out via a chute 23 with the help of appropriate means if necessary, the rump is released by shortly moving out the back support 15. The latter as well as the entraining element 6 are then guided back to their basic positions.

Figure 6:
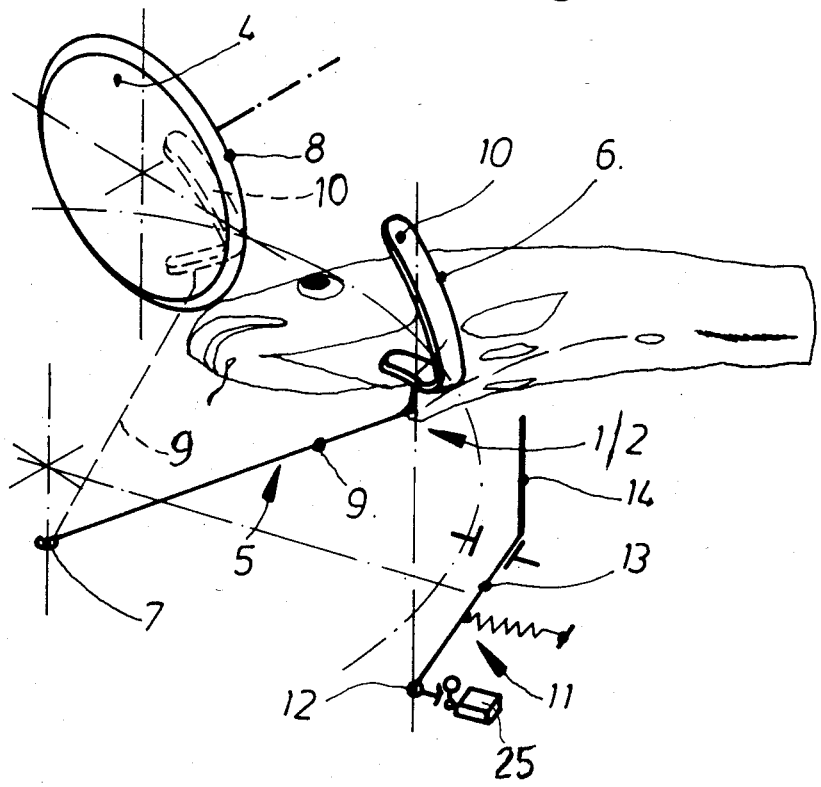
FIG. 6 is a perspective view showing in detail the construction and relative positioning of the circular knife, entraining element and pin-shaped support element of the device of FIGS. 1–4, with portions of the device being shown schematically.

FIG. 6 shows the device of FIGS. 1-5 in a functional phase in which the fish has been taken over from the pin-shaped support element 14 by the entraining element 6 in the form of a V-shaped fork-like element 10 open in the conveying direction. The fish is shown carried to a position just short of its engagement with the circular knife 4 and before the cutting action of such knife commences.

In the device according to FIG. 5 the fish prepared in the same way is guided between the entraining element 6 of the continuously circulating conveyor 17 in such a way that the aligning element 20 comes to rest in the region of the opened gill cavity. In this position the next entraining element 6 which comes along penetrates the gill cavity and takes over the fish in order to convey it against the circular knife 4. The fish thus experiences on the back support an alignment of its body which enables the desired cutting. After separation of the head the back support 22 is swung out for a short while to release the rump and then guided back to support the next fish.

The aligning element may also be formed as a feeler corresponding to the embodiment of FIG. 1 and the conveyor 17 moved according to one pitch of the entraining elements 6 after activation of the signal emitter connected to the feeler. Back support elements can also be used which may be secured to an endless belt driven by the fish and slowed down to run with it, the running direction of the belt corresponding approximately to that of the line 24 (FIG. 5).

What is claimed is:

1. A device for processing fish having its throat opened and defining a head end and a tail end with flank sides and a belly therebetween by means of a cutting decapitation action, said device comprising support surface means for the fish to be processed, cutting means for performing said decapitating cut in a cutting plane, and conveyor means carrying entraining means for moving said fish against said cutting means in said cutting plane, wherein said support surface means are arranged to receive said fish resting on one of its sides and said head end leading, wherein pin-shaped support means extending approximately perpendicular to said support surface means are arranged to engage said fish at the base of said opened throat and to guide and hold said fish in a position in which said opened throat is located to be engaged by said entraining means, wherein said entraining means are driven to pivot in a controlled manner about an axis essentially perpendicular to said support surface means, to engage said opened throat from the side of said belly during said pivoting motion and to entrain said fish in a guided manner against said cutting means in continuation of said pivoting movement, and wherein said cutting plane is arranged essentially perpendicular to said support surface means and tangential to the path of said entraining means.

2. A device as claimed in claim 1, wherein said entraining means comprise a fork-shaped element being essentially V-shaped, open in the conveying direction and secured to pivot arm means, the plane of symmetry of said element extending essentially parallel to said support surface means.

3. A device as claimed in claim 1, wherein said conveyor means carrying said entraining means are driven for reciprocal movement toward and away from said fish.

4. A device as claimed in claim 2, wherein said conveyor means carrying said entraining means are driven for reciprocal movement toward and away from said fish.

5. A device as claimed in claim 1, wherein said entraining means are controlled by cam means with respect to their alignment.

6. A device as claimed in claim 2, wherein said entraining means are controlled by cam means with respect to their alignment.

7. A device as claimed in claim 1, wherein said entraining means are controlled by lever means with respect to their alignment.

8. A device as claimed in claim 2, wherein said entraining means are controlled by lever means with respect to their alignment.

9. A device as claimed in claim 1, wherein said conveyor means are arranged as a continuously circulating endless drive in a plane essentially to the plane of said support surface means and comprise deflection pulley means, said endless drive being equipped with said entraining means whose effective plane runs essentially perpendicular to the plane of said support surface means and whose path is almost tangential to the cutting plane of said cutting means in the region of said deflection pulley means.

10. A device for decapitation of fish by cutting, said fish having a head end and a tail end with flank sides and a belly side therebetween, and having its gill cavity opened by a throat cut, said device comprising:
   a support surface supporting said fish resting on one of its sides with said head end leading, for movement in a feeding direction from a feeding side therof to a cutting station at the opposite side thereof,
   cutting means mounted above said support surface at said cutting station, and defining a cutting plane substantially perpendicular to said support surface,
   an elongated support member mounted above said support surface and extending substantially perpendicularly thereto intermediate said feeding side and said cutting station, said support member being positioned to enter said throat cut as said fish is moved in said feeding direction and to arrive at a guiding position in which it engages the base of said throat cut, and
   conveyor means including at least one entraining member and means for driving said entraining member for movement about an axis substantially perpendicular to said support surface along a conveying path extending substantially tangentially to said cutting plane for moving said fish against said cutting means,
   said entraining member being positioned to enter said throat cut from the belly side and engage the base of said throat cut in its movement along said conveying path, and the entrain said fish in a guided manner against said cutting means in a continuation of its movement along said conveying path.

11. a device as claimed in claim 10, wherein said entraining member comprises a substantially V-shaped element defining a fork open in the conveying direction, and a driven pivot arm mounting said element for movement in said conveying path, the plane of symmetry of said element extending substantially parallel to said support surface.

12. A device as claimed in claim 10, wherein said entraining member is driven for reciprocal movement toward and away from said fish along said conveying path.

13. A device as claimed in claim 10, wherein said conveyor means also includes a continuously circulating endless drive mounting at least one entraining member and including deflection pulley means, said endless drive being disposed in a plane substantially parallel to the plane of said support surface and having a path extending substantially tangential to said cutting plane of said cutting means in the region of said deflection pulley means.

14. A device as claimed in claim 11, wherein said conveyor means also includes a continuously circulating endless drive mounting at least one of said V-shaped elements and including deflection pulley means, said endless drive being disposed in a plane substantially parallel to the plane of said support surface and having a path extending substantially tangential to said cutting plane of said cutting means in the region of said deflection pulley means.

15. A device as claimed in claim 10 wherein also includes a lever pivotally mounted above said base surface, and wherein said elongated support member comprises a pin mounted on said lever and projecting perpendicularly therefrom, said lever being sized and positioned to move said pin, in said guiding position engaging the base of said throat cut, to a location in which said throat cut is within the conveying path of the entraining member, whereby said entraining member entrains said fish within said throat cut and carries said fish away from said pin to said cutting means.

16. A device as claimed in claim 15 which also includes signal emitter means operatively coupled to said lever and operable to drive said entraining member in said conveying path to said cutting means, in response to movement of said lever toward said conveying path.

* * * * *